US012102603B2

(12) United States Patent
Van Skaik et al.

(10) Patent No.: US 12,102,603 B2
(45) Date of Patent: Oct. 1, 2024

(54) TRANSPARENT BOTTLES INCLUDING FACETED SIDE WALLS

(71) Applicant: The Procter & Gamble Company, Cincinnati, OH (US)

(72) Inventors: Elliott Michael Van Skaik, Liberty Township, OH (US); Dennis Lee Maclam, Mason, OH (US); Luis Peraza, New Albany, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/147,544

(22) Filed: Jan. 13, 2021

(65) Prior Publication Data

US 2021/0212899 A1 Jul. 15, 2021

Related U.S. Application Data

(60) Provisional application No. 62/960,170, filed on Jan. 13, 2020.

(51) Int. Cl.

*B65D 1/02* (2006.01)
*A61J 7/00* (2006.01)

(Continued)

(52) U.S. Cl.

CPC ............ *A61J 7/0046* (2013.01); *B65D 41/26* (2013.01); *B65D 47/06* (2013.01); *B65D 1/0223* (2013.01);

(Continued)

(58) Field of Classification Search

CPC .. A61J 7/0046; A61J 1/03; A61J 1/035; A61J 1/05; A61J 11/00; A61J 17/00;

(Continued)

(56) References Cited

U.S. PATENT DOCUMENTS 4,065,536 A * 12/1977 Lucas ...................... B65D 1/04 425/525
4,273,247 A 6/1981 Earls (Continued)

FOREIGN PATENT DOCUMENTS

CN 103932889 A 7/2014
DE 102012019629 A1 4/2014

(Continued)

OTHER PUBLICATIONS

PCT Search Report and Written Opinion for PCT/US2021/070020 dated Jul. 16, 2021, 21 pages.

(Continued)

*Primary Examiner* — Anthony D Stashick
*Assistant Examiner* — Marcos Javier Rodriguez Molina
(74) *Attorney, Agent, or Firm* — Gregory S. Darley-Emerson

(57) ABSTRACT

A transparent bottle for holding a liquid includes a bottle body that includes a front wall, a rear wall and a first side wall and a second side wall that extend between the front wall and the rear wall. The first side wall includes a central portion and a front faceted portion that extends between the central portion and the front wall. The front faceted portion is curved relative to the central portion and is separated from the central portion by a front outer transition line and is separated from the front wall by a front inner transition line. A bottom that extends between the front wall, the rear wall and the first and second side walls. The bottom provides a base structure for supporting the bottle in an upright, standing position. A shoulder extends inward from the bottle body and a neck extends outward from the shoulder toward a mouth.

17 Claims, 11 Drawing Sheets

(51) Int. Cl.
*B65D 25/54* (2006.01)
*B65D 41/26* (2006.01)
*B65D 47/06* (2006.01)

(52) U.S. Cl.
CPC ...... *B65D 25/54* (2013.01); *B65D 2501/0081* (2013.01)

(58) Field of Classification Search
CPC .. A61J 17/101; A61J 2200/60; A61J 2205/10; A61J 9/00; A61J 1/067; A61J 1/10; A61J 1/12; A61J 2200/50; A61J 3/00; A61J 7/04; B65D 41/26; B65D 47/06; B65D 2501/0081; B65D 1/0223; B65D 11/20; B65D 15/16; B65D 25/54; B65D 79/0084; B65D 65/00; B65D 23/08; B65D 1/02; B65D 1/0207; B65D 1/0215; B65D 1/023; B65D 1/0246; B65D 1/0261; B65D 1/0276; B65D 1/0292; B65D 1/04; B65D 1/14; B65D 1/18; B65D 1/225; B65D 1/26; B65D 1/265; B65D 1/32; B65D 1/34; B65D 1/40; B65D 1/42; B65D 1/44; B65D 11/10; B65D 11/22; B65D 15/08; B65D 15/22; B65D 17/506; B65D 21/02; B65D 21/0201; B65D 21/0202; B65D 21/0205; B65D 21/0209; B65D 21/0215; B65D 21/0217; B65D 21/0219; B65D 21/0223; B65D 21/0228; B65D 21/0237; B65D 21/08; B65D 2201/00; B65D 2203/00; B65D 2203/02; B65D 2203/08; B65D 2203/10; B65D 2203/12; B65D 2205/00; B65D 2205/02; B65D 2207/00; B65D 2215/00; B65D 2215/02; B65D 2215/04; B65D 2221/00; B65D 2231/001; B65D 2231/002; B65D 2231/004; B65D 2231/007; B65D 2251/0015; B65D 2251/0018; B65D 2231/02; B65D 2251/0021; B65D 2251/0028; B65D 2251/0078; B65D 2251/0087; B65D 2251/009; B65D 2251/0093; B65D 2251/065; B65D 2251/1016; B65D 2251/1025; B65D 2251/105; B65D 2251/1066; B65D 2251/20; B65D 2255/20; B65D 23/00; B65D 23/001; B65D 23/003; B65D 23/02; B65D 23/04; B65D 23/06; B65D 23/065; B65D 23/0828; B65D 23/0842; B65D 23/085; B65D 23/0857; B65D 23/0864; B65D 23/0871; B65D 23/0878; B65D 23/10; B65D 23/102; B65D 23/104; B65D 23/106; B65D 23/12; B65D 23/14; B65D 2313/00; B65D 2313/02; B65D 2313/10; B65D 2401/00; B65D 2401/05; B65D 25/00; B65D 25/02; B65D 25/04; B65D 25/10; B65D 25/14; B65D 25/205; B65D 25/36; B65D 25/38; B65D 25/42; B65D 25/48; B65D 25/525; B65D 25/56; B65D 2501/0018; B65D 2501/0036; B65D 2517/0013; B65D 2517/0061; B65D 2517/5029; B65D 2517/5083; B65D 2543/00027; B65D 2543/00074; B65D 2543/0092; B65D 2543/00101; B65D 2543/00111; B65D 2543/00157; B65D 2543/00194; B65D 2543/00296; B65D 2543/00407; B65D 2543/00416; B65D 2543/00425; B65D 2543/00435; B65D 2543/00509; B65D 2543/00518; B65D 2543/00527; B65D 2543/00537; B65D 2543/00546; B65D 2543/00555; B65D 2543/00564; B65D 2543/00574; B65D 2543/0062; B65D 2543/00629; B65D 2543/00638; B65D 2543/00685; B65D 2543/00731; B65D 2543/0074; B65D 2543/00759; B65D 2543/00796; B65D 2543/00805; B65D 2543/00842; B65D 2547/063; B65D 2547/066; B65D 2555/025; B65D 2565/384; B65D 2565/385; B65D 2565/388; B65D 2571/00018; B65D 2571/00024; B65D 2571/00037; B65D 2571/00043; B65D 2571/00049; B65D 2571/00055; B65D 2571/00061; B65D 2571/00067; B65D 2571/00117; B65D 2571/00141; B65D 2571/00154; B65D 2571/00314; B65D 2571/0037; B65D 2571/0066; B65D 2571/00666; B65D 2571/00672; B65D 2571/00796; B65D 2571/00864; B65D 2571/00925; B65D 2575/367; B65D 2575/586; B65D 2577/205; B65D 2581/3408; B65D 2581/3413; B65D 2581/344; B65D 2581/3447; B65D 2581/3448; B65D 2581/3452; B65D 2581/3462; B65D 2581/3464; B65D 2581/3472; B65D 2581/3479; B65D 2581/3481; B65D 2581/3483; B65D 2581/3487; B65D 2581/3489; B65D 2581/3494; B65D 2583/00; B65D 2583/005; B65D 2583/0481; B65D 27/00; B65D 29/00; B65D 3/22; B65D 31/00; B65D 31/02; B65D 31/04; B65D 31/08; B65D 31/10; B65D 31/12; B65D 31/16; B65D 31/18; B65D 33/00; B65D 33/004; B65D 33/007; B65D 33/008; B65D 33/01; B65D 33/02; B65D 33/04; B65D 33/06; B65D 33/08; B65D 33/16; B65D 33/1658; B65D 33/18; B65D 33/20; B65D 33/24; B65D 33/25; B65D 33/2508; B65D 33/2533; B65D 33/2541; B65D 33/255; B65D 33/2566; B65D 33/28; B65D 35/00; B65D 35/02; B65D 35/04; B65D 35/08; B65D 35/10; B65D 35/12; B65D 35/22; B65D 35/24; B65D 35/242; B65D 35/40; B65D 37/00; B65D 39/00; B65D 39/08; B65D 41/00; B65D 41/02; B65D 41/04; B65D 41/0414; B65D 41/045; B65D 41/0471; B65D 41/0478; B65D 41/0485; B65D 41/06; B65D 41/18; B65D 41/265; B65D 41/32; B65D 41/3404; B65D 41/48; B65D 41/56; B65D 41/62; B65D 43/02; B65D 43/0212; B65D 43/0231; B65D 43/16; B65D 43/161; B65D 43/162; B65D 43/163; B65D 43/164; B65D 43/169; B65D 43/18; B65D 43/22; B65D 43/24; B65D 43/26; B65D 47/043; B65D 47/046; B65D 47/063; B65D 47/066; B65D 47/08; B65D 47/0804; B65D 47/0828; B65D 47/0838; B65D 47/0857; B65D 57/0871; B65D 47/0885; B65D 47/0895; B65D 47/12; B65D 47/121;

B65D 47/122; B65D 47/123; B65D 47/127; B65D 47/128; B65D 47/20; B65D 47/2006; B65D 47/2018; B65D 47/2031; B65D 47/2037; B65D 47/2075; B65D 47/242; B65D 47/243; B65D 47/244; B65D 47/261; B65D 47/265; B65D 47/268; B65D 47/283; B65D 47/30; B65D 47/305; B65D 47/32; B65D 47/36; B65D 47/40; B65D 47/42; B65D 49/00; B65D 5/0095; B65D 5/02; B65D 5/0209; B65D 5/0227; B65D 5/0272; B65D 5/029; B65D 5/067; B65D 5/16; B65D 5/18; B65D 5/20; B65D 5/32; B65D 5/321; B65D 5/42; B65D 5/4204; B65D 5/4208; B65D 5/4212; B65D 5/4216; B65D 5/4233; B65D 5/4237; B65D 5/46016; B65D 5/46024; B65D 5/46088; B65D 5/48014; B65D 5/4802; B65D 5/5021; B65D 5/5028; B65D 5/503; B65D 5/52; B65D 5/54; B65D 5/5405; B65D 5/541; B65D 5/5415; B65D 5/542; B65D 5/5435; B65D 5/5445; B65D 5/548; B65D 5/563; B65D 5/566; B65D 5/62; B65D 5/66; B65D 5/6608; B65D 5/68; B65D 5/701; B65D 5/708; B65D 5/725; B65D 5/727; B65D 5/746; B65D 5/76; B65D 50/00; B65D 50/043; B65D 50/046; B65D 51/00; B65D 51/1616; B65D 51/1633; B65D 51/1644; B65D 51/165; B65D 51/1661; B65D 51/1677; B65D 51/1683; B65D 51/18; B65D 51/20; B65D 51/24; B65D 51/245; B65D 51/248; B65D 51/249; B65D 51/28; B65D 51/32; B65D 53/02; B65D 53/04; B65D 55/00; B65D 55/022; B65D 55/024; B65D 55/06; B65D 55/0818; B65D 55/0854; B65D 55/16; B65D 57/00; B65D 57/003; B65D 57/005; B65D 65/14; B65D 65/16; B65D 65/18; B65D 65/20; B65D 65/22; B65D 65/38; B65D 65/40; B65D 65/403; B65D 65/406; B65D 65/42; B65D 65/46; B65D 65/466; B65D 71/00; B65D 71/0085; B65D 71/0088; B65D 71/0096; B65D 71/02; B65D 71/06; B65D 71/063; B65D 71/066; B65D 71/08; B65D 71/10; B65D 71/125; B65D 71/30; B65D 71/38; B65D 71/70; B65D 75/00; B65D 75/002; B65D 75/006; B65D 75/008; B65D 75/04; B65D 75/06; B65D 75/08; B65D 75/12; B65D 75/20; B65D 75/245; B65D 75/26; B65D 75/30; B65D 75/32; B65D 75/322; B65D 75/323; B65D 75/327; B65D 75/36; B65D 75/366; B65D 75/367; B65D 75/38; B65D 75/42; B65D 75/44; B65D 75/46; B65D 75/48; B65D 75/52; B65D 75/522; B65D 75/525; B65D 75/54; B65D 75/56; B65D 75/563; B65D 75/566; B65D 75/58; B65D 75/5805; B65D 75/5811; B65D 75/5816; B65D 75/5822; B65D 75/5827; B65D 75/5833; B65D 75/5838; B65D 75/5844; B65D 75/585; B65D 75/5855; B65D 75/5866; B65D 75/5872; B65D 75/5877; B65D 75/5883; B65D 75/5894; B65D 75/66; B65D 77/00; B65D 77/003; B65D 77/02; B65D 77/04; B65D 77/0406; B65D 77/0426; B65D 77/0433; B65D 77/046; B65D 77/06; B65D 77/062; B65D 77/065; B65D 77/20; B65D 77/2052; B65D 77/2056; B65D 77/2068; B65D 77/2072; B65D 77/22; B65D 77/225; B65D 77/24; B65D 77/245; B65D 77/28; B65D 77/30; B65D 77/32; B65D 77/38; B65D 79/00; B65D 79/005; B65D 79/0087; B65D 81/00; B65D 81/02; B65D 81/022; B65D 81/03; B65D 81/052; B65D 81/22; B65D 81/24; B65D 81/26; B65D 81/1264; B65D 81/266; B65D 81/267; B65D 81/28; B65D 81/30; B65D 81/3227; B65D 81/3244; B65D 81/325; B65D 81/3261; B65D 81/3266; B65D 81/3272; B65D 81/3283; B65D 81/3288; B65D 81/3294; B65D 81/3415; B65D 81/3446; B65D 81/3453; B65D 81/3461; B65D 81/3484; B65D 81/3492; B65D 81/36; B65D 81/365; B65D 81/366; B65D 81/3869; B65D 83/00; B65D 83/0005; B65D 83/0011; B65D 83/0022; B65D 83/0033; B65D 83/0055; B65D 83/0061; B65D 83/0083; B65D 83/0094; B65D 83/04; B65D 83/0409; B65D 83/0418; B65D 83/0463; B65D 83/0481; B65D 83/06; B65D 83/08; B65D 83/0805; B65D 83/0811; B65D 83/0817; B65D 83/0841; B65D 83/0847; B65D 83/0894; B65D 83/14; B65D 83/20; B65D 83/201; B65D 83/202; B65D 83/205; B65D 83/206; B65D 83/207; B65D 83/22; B65D 83/28; B65D 83/285; B65D 83/30; B65D 83/32; B65D 83/38; B65D 83/384; B65D 83/40; B65D 83/42; B65D 83/425; B65D 83/44; B65D 83/46; B65D 83/48; B65D 83/54; B65D 83/565; B65D 83/60; B65D 83/62; B65D 83/64; B65D 83/66; B65D 83/663; B65D 83/68; B65D 83/682; B65D 83/70; B65D 83/72; B65D 83/752; B65D 83/753; B65D 85/00; B65D 85/07; B65D 85/08; B65D 85/18; B65D 85/36; B65D 85/546; B65D 85/62; B65D 85/67; B65D 85/671; B65D 85/672; B65D 85/70; B65D 85/73; B65D 85/804; B65D 85/8043; B65D 85/8046; B65D 85/8055; B65D 85/8061; B65D 85/8067; B65D 85/808; B65D 85/816

USPC ..... 220/662, 732, 2, 2.1 R, 4.04, 4.08, 4.09, 220/4.12, 4.14, 4.21, 4.22, 4.24, 4.26, 220/4.28, 4.29, 4.31, 4.33, 4.34, 6, 7, 8, 220/9.1, 9.2, 9.3, 23.2, 23.4, 23.6, 23.8, 220/23.83, 23.86, 23.87, 23.88, 23.89, 220/23.9, 23.91, 62, 62.11, 62.12, 62.13, 220/62.15, 62.18, 62.19, 62.2, 62.21, 220/62.22, 88.1, 88.2, 89.1, 89.2, 89.4, 220/200, 202, 203.01, 203.08, 203.11, 220/203.17, 203.22, 203.23, 212, 212.5, 220/213, 215, 221, 226, 229, 230, 231, 220/233, 234, 235, 240, 252, 253, 254.1, 220/254.2, 254.3, 254.5, 254.8, 254.9, 220/255, 255.1, 256.1, 257.2, 258.1,

220/258.2, 258.3, 258.4, 258.5, 259.1, 220/259.2, 259.3, 259.5, 260, 261, 263, 220/264, 266, 267, 268, 269, 270, 273, 220/274, 275, 276, 277, 278, 281, 283, 220/284, 288, 289, 290, 293, 294, 296, 220/298, 301, 304, 310.1, 314, 318, 319, 220/322, 324, 326, 327, 345.4, 345.5, 220/350, 351, 359.1, 359.2, 359.3, 359.4, 220/361, 363, 364, 366.1, 367.1, 369, 220/370, 371, 372, 373, 374, 375, 376, 220/379, 380, 480, 483, 485, 486, 491, 220/494, 495, 495.01, 495.03, 495.05, 220/495.06, 495.08, 495.11, 500, 501, 220/502, 503, 505, 506, 507, 509, 510, 220/511, 512, 513, 514, 515, 516, 517, 220/518, 519, 520, 521, 522, 523, 524, 220/525, 526, 528, 529, 531, 532, 533, 220/552, 553, 554, 555, 556, 557, 560, 220/560.01, 560.04, 560.1, 560.13, 562, 220/565, 566, 568, 571, 572, 573.2, 220/573.4, 574, 574.2, 575, 577, 578, 220/579, 581, 586, 592, 592.01, 592.02, 220/592.03, 592.04, 592.05, 592.06, 220/592.09, 592.12, 592.14, 592.17, 220/592.2, 592.21, 592.22, 592.23, 220/592.24, 592.25, 592.26, 592.27, 220/592.28, 600, 601, 604, 605, 606, 607, 220/608, 609, 612, 613, 615, 616, 618, 220/619, 620, 621, 623, 624, 626, 628, 220/630, 632, 633, 634, 635, 638, 639, 220/643, 645, 646, 648, 651, 654, 657, 220/660, 661, 665, 666, 667, 668, 669, 220/670, 671, 672, 673, 674, 675, 676, 220/677, 678, 680, 681, 682, 688, 690, 220/691, 694, 694.1, 695, 701, 703, 705, 220/706, 707, 708, 709, 710, 710.5, 711, 220/712, 713, 714, 715, 717, 718, 719, 220/720, 721, 723, 728, 729, 731, 735, 220/737, 738, 739, 740, 745, 752, 754, 220/755, 756, 759, 760, 762, 769, 770, 220/771, 772, 773, 780, 781, 782, 784, 220/785, 789, 795, 796, 802, 805, 810, 220/813, 825, 826, 827, 830, 831, 832, 220/834, 835, 837, 839, 840, 842, 847, 220/849, 890, 901, 902, 903, 905, 906, 220/907, 908, 909, 912, 913, 915, 915.1, 220/915.2, 916, 918, 920, 921, FOR. 100, 220/DIG. 9, DIG. 8, DIG. 6, DIG. 30, 220/DIG. 27, DIG. 22, DIG. 2, DIG. 16, 220/DIG. 15, DIG. 14, DIG. 1, 9.4; 215/382, 2, 4, 6, 10, 11.1, 11.3, 11.4, 215/11.5, 11.6, 12.1, 12.2, 13.1, 14, 15, 215/17, 18, 19, 20, 21, 22, 23, 25, 26, 27, 215/28, 29, 40, 43, 44, 45, 46, 51, 200, 215/201, 203, 207, 209, 211, 212, 213, 215/214, 215, 216, 217, 218, 219, 220, 215/221, 222, 223, 224, 225, 226, 227, 215/228, 229, 230, 231, 232, 233, 235, 215/236, 237, 239, 245, 246, 247, 248, 215/249, 250, 251, 252, 253, 254, 255, 215/256, 257, 258, 260, 261, 262, 263, 215/266, 267, 270, 271, 272, 274, 275, 215/276, 277, 278, 279, 282, 284, 286, 215/287, 291, 292, 293, 294, 295, 296, 215/297, 298, 301, 302, 304, 305, 306, 215/307, 308, 309, 310, 311, 312, 313, 215/314, 316, 317, 318, 319, 320, 321, 215/322, 324, 325, 326, 327, 328, 329, 215/330, 331, 332, 334, 335, 337, 341, 215/342, 343, 344, 345, 346, 347, 349, 215/350, 351, 352, 353, 354, 355, 356, 215/358, 359, 360, 361, 362, 363, 364, 215/365, 366, 367, 370, 371, 372, 373, 215/374, 375, 376, 377, 378, 379, 380, 215/381, 383, 384, 385, 386, 387, 388, 215/389, 390, 391, 392, 393, 394, 395, 215/396, 397, 398, 399, 400, 900, 901, 215/902, 205, DIG. 8, DIG. 7, DIG. 6, 215/DIG. 5, DIG. 3, DIG. 1, 55, 50, 48, 215/47, 42, 41, 11.2; 206/0.6, 1.5, 1.8, 3, 206/5, 5.1, 19, 38, 39, 39.7, 45.21, 45.23, 206/94, 831, 83.5, 828, 823, 822, 821, 206/820, 819, 818, 816, 815, 814, 813, 206/810, 809, 807, 806, 805, 803, 784, 206/783, 782, 781, 780, 779, 778, 777, 206/776, 775, 774, 773, 772, 770, 77.1, 206/769, 768, 767, 766, 765, 764, 0.5, 206/103, 111, 132, 139, 140, 141, 142, 206/143, 144, 145, 147, 148, 149, 150, 206/151, 152, 153, 154, 155, 156, 157, 206/158, 159, 160, 161, 162, 163, 164, 206/165, 166, 167, 168, 169, 170, 171, 206/172, 173, 174, 175, 176, 177, 178, 206/179, 180, 181, 182, 183, 184, 185, 206/186, 187, 188, 189, 190, 191, 192, 206/193, 194, 195, 196, 197, 198, 199, 206/200, 201, 202, 203, 204, 205, 209.1, 206/210, 213.1, 214, 216, 217, 219, 221, 206/222, 223, 225, 228, 229, 232, 233, 206/268, 277, 278, 287, 287.1, 289, 299, 206/303, 308.1, 309, 311, 312, 314, 206/315.1, 315.11, 315.2, 315.3, 315.6, 206/315.8, 320, 326, 349, 363, 364, 365, 206/366, 370, 372, 373, 376, 378, 386, 206/389, 390, 392, 395, 408, 409, 418, 206/420, 426, 427, 428, 429, 430, 431, 206/432, 433, 434, 435, 438, 440, 443, 206/446, 45.24, 45.26, 45.29, 451, 452, 206/453, 454, 456, 457, 459.1, 459.5, 206/460, 461, 462, 463, 464, 466, 469, 206/471, 472, 473, 474, 476, 477, 478, 206/479, 480, 481, 482, 484, 484.2, 485, 206/485.1, 486, 488, 489, 490, 493, 497, 206/499, 501, 503, 504, 505, 506, 507, 206/508, 509, 510, 511, 512, 513, 514, 206/515, 516, 518, 519, 520, 521, 521.1, 206/521.2, 522, 523, 524.1, 524.2, 524.3, 206/524.4, 524.5, 524.6, 524.7, 524.8, 206/525, 525.1, 526, 527, 528, 53, 531, 206/532, 534, 538, 539, 540, 541, 544, 206/545, 549, 557, 558, 559, 561, 562, 206/563, 564, 565, 568, 569, 570, 571, 206/572, 575, 576, 581, 583, 584, 585, 206/586, 587, 588, 589, 590, 591, 592, 206/593, 594, 597, 600, 63.3, 69, 701, 206/727, 730, 731, 733, 734, 736, 738, 206/744, 745, 746, 747, 750, 752, 755, 206/756, 762, 763; D9/449, 451, 529, D9/560, 565, 575

See application file for complete search history.

(56) References Cited

U.S. PATENT DOCUMENTS

| | | | | |
|---|---|---|---|---|
| 5,392,937 A * | 2/1995 | Prevot | B65D 23/102 215/396 |
| 8,561,821 B2 * | 10/2013 | Harris | B65D 1/0261 220/666 |
| 8,899,437 B2 | 12/2014 | Vogel | |
| D775,530 S * | 1/2017 | Gayner | D9/563 |
| 9,541,440 B2 | 1/2017 | Larson | |
| 9,862,518 B2 * | 1/2018 | Gill | B65D 79/0084 |
| D886,615 S | 6/2020 | Van Skaik | |
| D886,616 S | 6/2020 | Van Skaik | |
| D886,625 S | 6/2020 | Van Skaik | |
| D887,849 S | 6/2020 | Van Skaik | |
| D925,371 S * | 7/2021 | Maclam | D9/716 |
| 2009/0057263 A1 * | 3/2009 | Barker | B65D 79/0084 215/381 |
| 2012/0018440 A1 * | 1/2012 | Lane | B65D 1/42 220/669 |
| 2014/0305952 A1 * | 10/2014 | Harris | B65D 1/0292 220/666 |
| 2015/0094650 A1 | 4/2015 | Young | |
| 2015/0251810 A1 * | 9/2015 | Glaser | B65D 23/102 215/382 |
| 2018/0312303 A1 * | 11/2018 | Meyer | B65D 41/0471 |

FOREIGN PATENT DOCUMENTS

| | | | | |
|---|---|---|---|---|
| DE | 102016002467 A1 * | 8/2017 | A61J 1/05 |
| EP | 1386844 A1 | 2/2004 | |
| EP | 1386884 A1 | 2/2004 | |
| EP | 1459991 A1 | 9/2004 | |
| EP | 1637458 A1 | 3/2006 | |
| JP | 3808160 B2 * | 8/2006 | B65D 1/0292 |
| JP | 6569778 B2 | 9/2019 | |
| KR | 20090118716 * | 11/2009 | B65D 1/0223 |
| KR | 20090118716 A * | 11/2009 | B65D 1/0223 |
| WO | DM/099364 | 10/2017 | |

OTHER PUBLICATIONS

PCT International Search Report and Written Opinion of the International Searching Authority for PCT/US2021/070020, dated Jul. 16, 2021; 20 pages.
U.S. Appl. No. 29/720,367, filed Jan. 13, 2020, Reichling et al.
U.S. Appl. No. 29/720,386, filed Jan. 13, 2020, Takahashi et al.
U.S. Appl. No. 17/147,577, filed Jan. 13, 2021, Reichling et al.

* cited by examiner

TRANSPARENT BOTTLES INCLUDING FACETED SIDE WALLS

FIELD

One or more embodiments shown and described herein are generally directed to bottles and, in particular, to transparent bottles that include side walls that include faceted portions.

BACKGROUND

Many current bottles for holding liquids may be shrink wrapped with a label. The labels tend to extend about the entire periphery of the bottles. This shrink wrap about the entire bottle can be desirable for increased label area and ease of application, but can limit visibility of contents within the bottles. In some instances, the liquid within the bottles may have a color that provides an indication of liquid type and/or flavor. Some medications, as an example, have different flavors or compositions that can be detected by a consumer using liquid color. If those colors visible through the bottles are obscured or somehow changed in appearance on a shelf, additional effort may be needed to identify the contents and/or decide to purchase. Further, the colors may appear inconsistent with the liquid outside the bottle (e.g., in a dose cup) than inside the bottle, which can lead to consumer confusion and dissatisfaction.

Accordingly, transparent bottles are desired that have increased viewing area of contents of the bottles.

SUMMARY

In one embodiment, a transparent bottle for holding a liquid includes a bottle body that includes a front wall, a rear wall and a first side wall and a second side wall that extend between the front wall and the rear wall. The first side wall includes a central portion and a front faceted portion that extends between the central portion and the front wall. The front faceted portion is angled relative to the central portion and is separated from the central portion by a front outer transition line and is separated from the front wall by a front inner transition line. A bottom extends between the front wall, the rear wall and the first and second side walls. The bottom provides a base structure for supporting the bottle in an upright, standing position. A shoulder extends inward from the bottle body and a neck extends outward from the shoulder toward a mouth.

In another embodiment, a transparent bottle for holding a liquid includes a bottle body that includes a front wall, a rear wall and a first side wall that extends between the front wall and the rear wall. The first side wall includes a central portion and a front faceted portion that extends between the central portion and the front wall. A second side wall extends between the front wall and the rear wall. The second side wall includes another central portion and another front faceted portion that extends between the central portion and the front wall. A shoulder extends inward from the bottle body. A neck extends outward from the shoulder toward a mouth. At least about five percent of a front facing area of the bottle body is uncovered and transparent through the front faceted portion when 100 percent of the front wall is covered and opaque.

BRIEF DESCRIPTION OF THE DRAWINGS

The following detailed description of specific embodiments of the present description can be best understood when read in conjunction with the drawings enclosed herewith.

Figure 1:
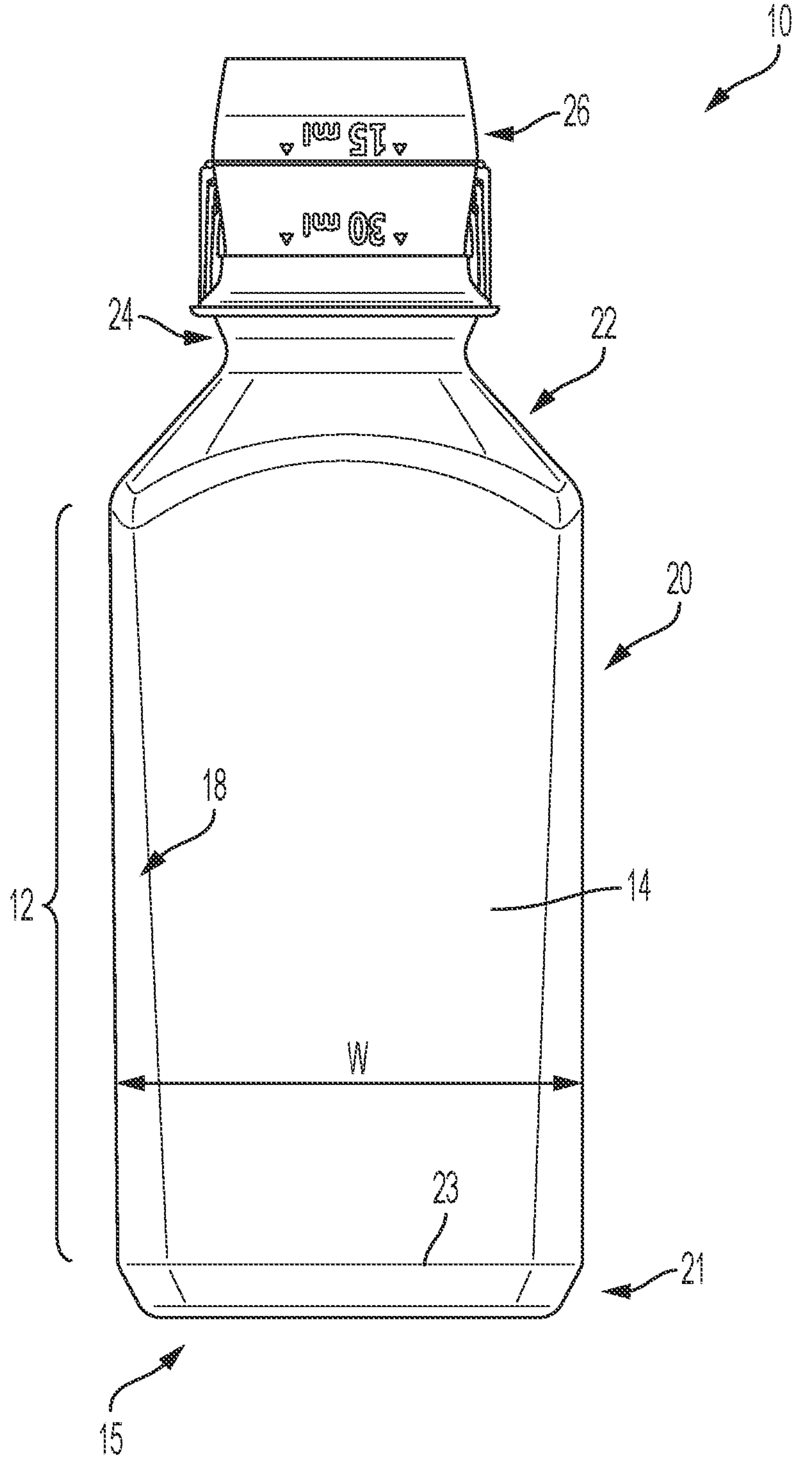
FIG. 1 is a front view of a bottle including dose cup, according to one or more embodiments shown and described herein.

The embodiments set forth in the drawings are illustrative in nature and not intended to be limiting of the description defined by the claims. Moreover, individual features of the drawings and claims will be more fully apparent and understood in view of the detailed description.

DETAILED DESCRIPTION

Embodiments described herein generally relate to bottles that include faceted side walls that include front faceted portions and rear faceted portions that are separated by central portions. The front and rear portions are faceted in that they extend at an angle to the central portions. The front and rear portions may also have a reduced radius of curvature compared to the central portions. These angled arrangements and reduced radiuses of curvature compared to the central portions provide outer transition lines between the faceted portions and the central portions. Inner transition lines are also provided between the front faceted portions and front walls of the bottles and the rear faceted portions and rear walls of the bottles. Because the outer transition lines are located outside the inner transition lines, the front faceted portions of both side walls are visible from in front of the bottle adjacent the front walls and the rear faceted portions are visible from behind the bottle adjacent the rear walls.

As will be described below, the inner transition lines between the front wall of the bottle and the front faceted portions provide relatively sharp bends that define boundary lines between the front faceted portions and the front wall. A front label may be shaped and sized to cover an area of the front wall entirely between the inner transition lines thereby rendering the front faceted portions visible adjacent the front label from in front of the bottle. Likewise, the inner transition lines between the rear wall of the bottle and the rear faceted portions provide relatively sharp bends that define boundary lines between the rear faceted portions and the rear wall. A rear label may be shaped and sized to cover an area of the rear wall entirely between the inner transition lines thereby rendering the rear faceted portions visible adjacent the rear label from behind the bottle.

As used herein, the terms “inner” and “interior” refer to a direction toward a center of the bottle. The terms “outer” and “exterior” refer to a direction away from the center of the bottle. Further, the terms “top.” “bottom” and “side” are used only with reference to the figures as drawn and are not intended to imply absolute orientation unless otherwise expressly stated.

Figure 2:
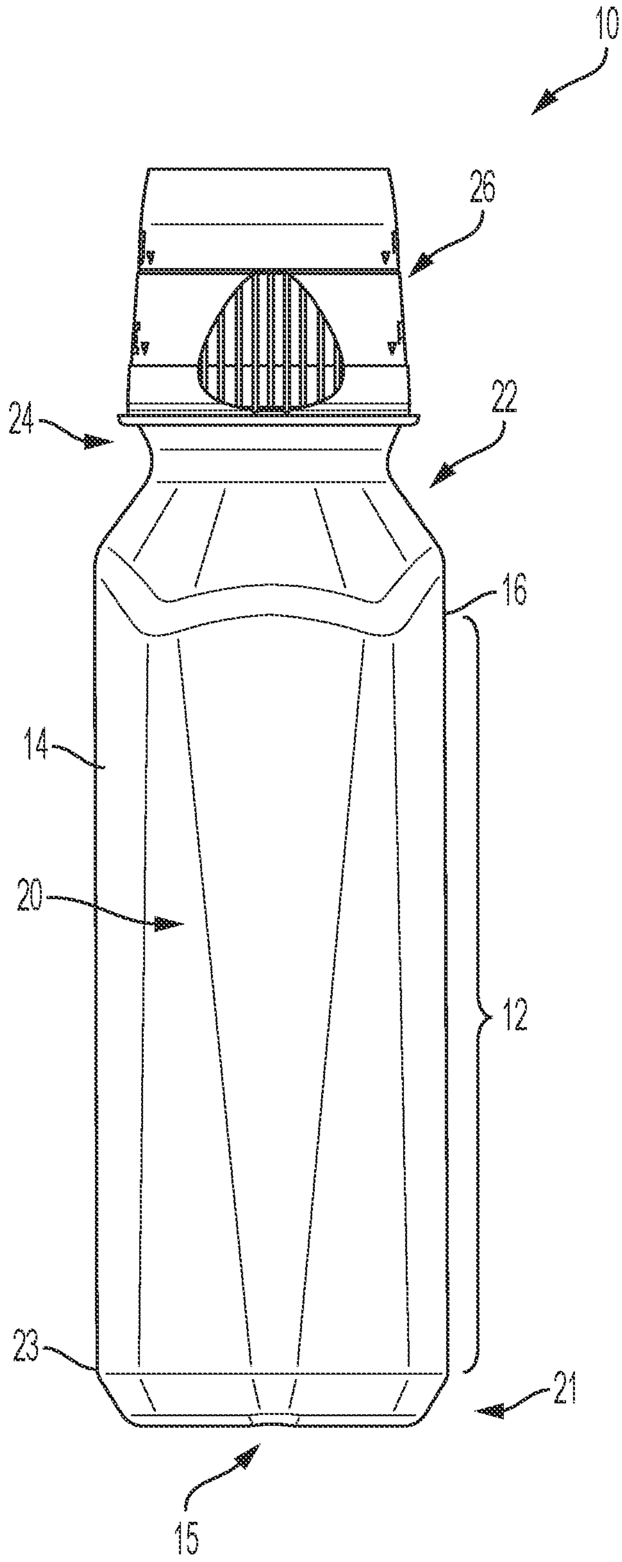
FIG. 2 is a side view of the bottle of FIG. 1, according to one or more embodiments shown and described herein.

Referring to FIGS. 1 and 2, a bottle 10 includes a bottle body 12 that includes a front wall 14, a rear wall 16 and side walls 18 and 20 that extend between the front wall 14 and the rear wall 16. A bottom 15 may provide a base structure for the bottle 10 that extends between the front wall 14, rear wall 16 and side walls 18 and 20. The bottom 15 may include a tapered portion 21 that tapers inward from the front wall 14, rear wall 16 and side walls 18 and 20 along a bottom transition line 23. In some embodiments, the taper may be between about 50 degrees and 70 degrees, such as about 60 degrees from horizontal. The bottom 15 may provide the base structure for supporting the bottle 10 in an upright, standing position, as illustrated by FIGS. 1 and 2, when resting on a support surface. The bottom 15 may be flat and may include some curvature, such as including a portion that is concave down.

The front wall 14, rear wall 16 and side walls 18 and 20 together form the bottle body 12. A maximum width W of the bottle 10 may be located within the bottle body 12. The width W of the bottle 10 may depend on a size of the bottle 10. As examples, there may be a six ounce size bottle 10, an eight ounce size bottle 10, a twelve ounce size bottle 10, and a sixteen ounce size bottle each with a different width W and/or other dimensions. The bottle body 12 extends between the bottom 15 and a shoulder 22. The shoulder 22 extends inwardly from the bottle body 12 to a neck 24. In some embodiments, the shoulder 22 tapers inwardly from the bottle body 12 at an angle of between about 40 degrees and about 50 degrees at the side walls 18 and 20 and an angle of between about 50 degrees and 60 degrees at the front wall 14 and the rear wall 16. The neck 24 and finish of the bottle 10 are at least partially covered by a dose cup 26 in FIGS. 1 and 2. In some embodiments, a dose cup may not be present or may be removed. In other words, the bottle 10 described herein may not include a dose cup. A cap may be connected at a mouth of the bottle underneath the dose cup 26 in order to seal the contents of the bottle 10 from the environment.

Figure 3:
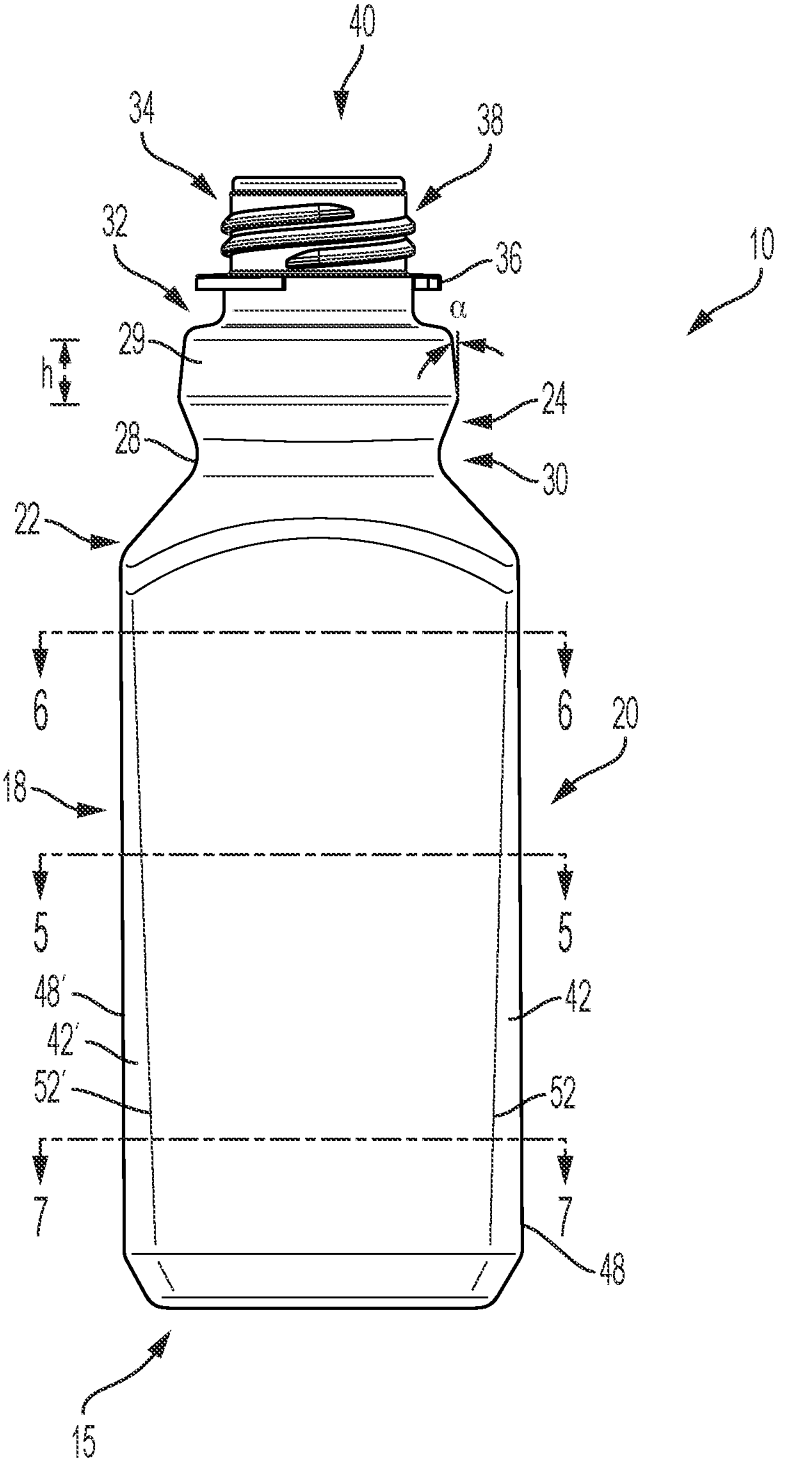
FIG. 3 is a front view of the bottle of FIG. 1 without the dose cup, according to one or more embodiments shown and described herein.

FIG. 3 illustrates the bottle 10 without the dose cup 26 or cap. The neck 24 extends outward from the shoulder 22 at a transition region 28. The neck 24 then increases in width to provide a filling region 29 of increased volume compared to a narrowed region 30 between the filling region 29 and the shoulder 22. The filling region 29 is of increased volume (e.g., between about 15 mL and about 25 mL, such as about 19 mL) to inhibit unintended loss of liquid from the bottle 10 during a bottle filling process. The filling region 29 can have a height, h, of greater than about 0.2 inch (six mm), such as from about 0.2 inch to about 0.5 inch (twelve mm). The filling region 29 can have a draft angle $\alpha$ of greater than zero degrees, such as from about zero degrees to about fifteen degrees, alternatively from about two degrees to about 10 degrees, alternatively from about 5 degrees to about 8 degrees. The increased volume and vertical height of the filling region 29 is configured to allow the filling region 29 to engage with the dose cup 26 and can provide a more stable and level surface against which the dose cup can rest to reinforce the intended positioning of the dose cup 26 on the bottle 10 after application. The filling region 29 can also provide enhanced tamper resistance by adding additional stress to more consistently rip a neckband when a tamper evident plastic band is attempted to be tampered with. The neck 24 decreases in width at a region 32 between the filling region 29 and the finish 34, which includes a collar 36 and a lip 38. The lip 38 may be threaded to threadably receive the cap. Closures other than threads may be used, such as a snap-type closure. The lip 38 terminates at a mouth 40 of the bottle 10 that provides a location of ingress and egress of contents of the bottle 10.

Figure 4:
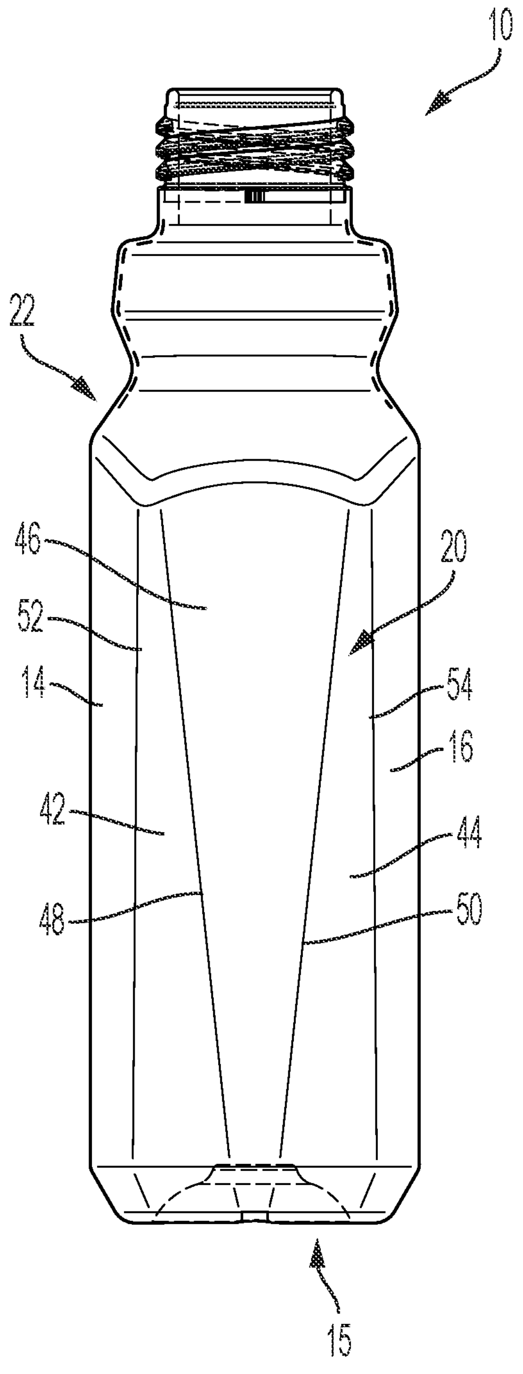
FIG. 4 is a side view of the bottle of FIG. 3, according to one or more embodiments shown and described herein.

Referring also to FIG. 4, the side walls 18 and 20 include a front faceted portion 42 and a rear faceted portion 44 that are separated by a central portion 46. For purposes of simplicity, only one side wall 20 is described in detail. It should be understood that the other side wall 18 may include the same facet features. Indeed, the front and rear halves of the bottle body 12 may be substantially the same.

Figure 5:
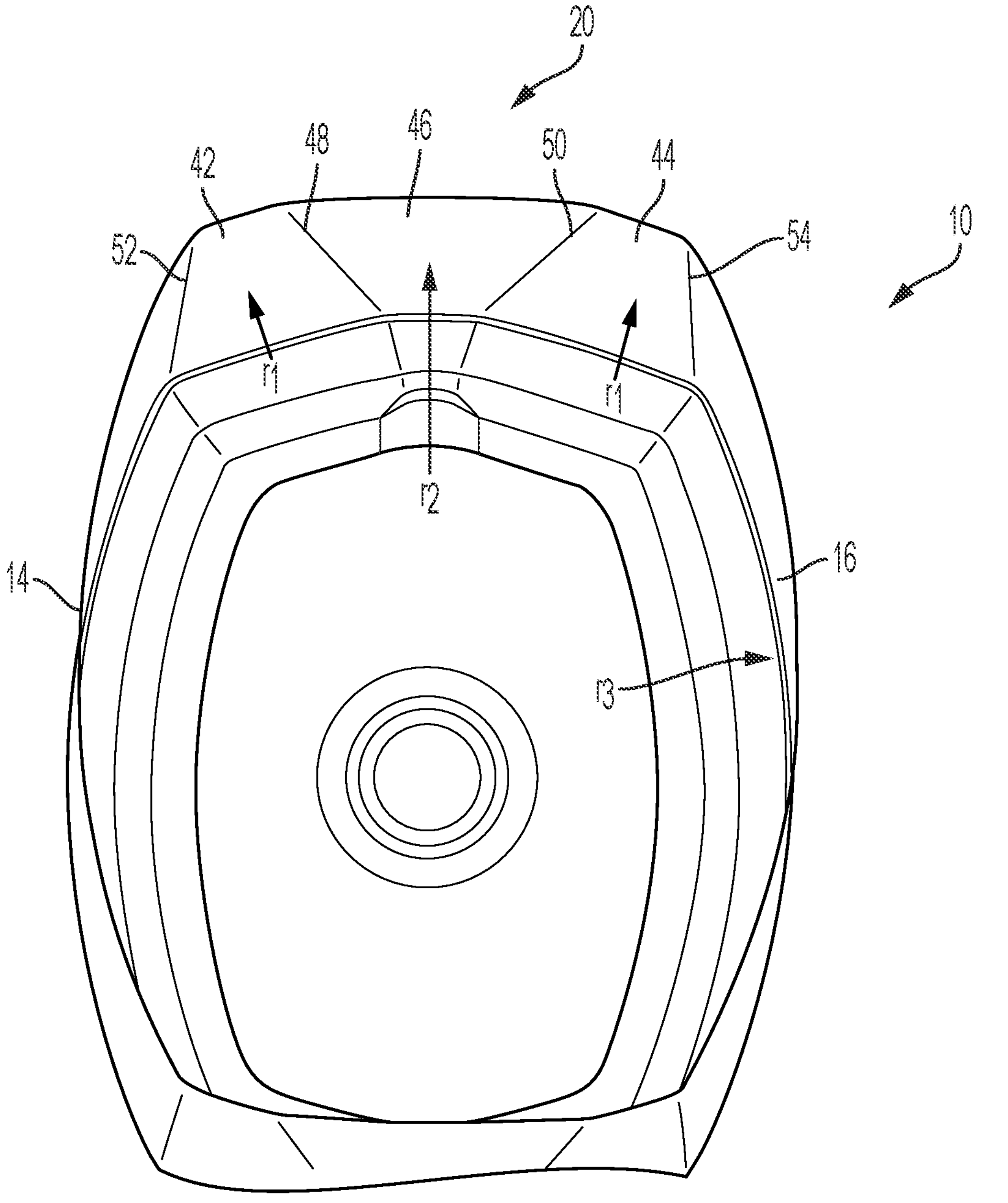
FIG. 5 is a horizontal section view along line 5-5 of the bottle of FIG. 3, according to one or more embodiments shown and described herein.

Referring particularly to FIG. 4, the side walls 18 and 20 include the front faceted portion 42 and the rear faceted portion 44. The central portion 46 of the side walls 18 and 20 and front wall 14 are reference surfaces between which the front faceted portion 42 extends. Likewise, the central portion 46 and rear wall 16 are reference surfaces between which the rear faceted portion 44 extends. Referring to FIG. 5 showing a horizontal section view through a center of the bottle 10, the front faceted portion 42 and the rear faceted portion 44 are faceted in that they have a reduced radius of curvature $r_1$ compared to a radius of curvature $r_2$ of the central portion 46 and are offset at an angle to the central portion 46. While the radius of curvature of the front faceted portion 42 and the rear faceted portion 44 may be the substantially the same, they may be different and less than the radius of curvature $r_2$. In some embodiments, the radius of curvature $r_2$ may be between about five inches (127 mm) and about seven inches (178 mm) while the radius of curvature $r_1$ is less than $r_2$, such as between about three inches (76 mm) and about five inches (127 mm). It should be noted that, in some embodiments, the radius of curvature $r_1$ may change slightly along heights and widths of the front faceted portion 42 and the rear faceted portion 44. In some embodiments, $r_1$ may be between about three inches (76 mm) and about five inches (127 mm), such as between about four inches (102 mm) and about 4.5 inches (114 mm) along entire heights and widths of the front faceted portion 42 and the rear faceted portion 44. The radius of curvature $r_2$ may remain substantially constant along entire heights and widths of the central portion 46.

In some embodiments, features and designs may be embossed into the faceted portions 42 and 44 and/or shoulder 22. The embossed features can provide some indicia to a consumer of contents within the bottle 10. Non-limiting examples of indicia can include alpha-numeric indicia, images, shapes, textures, and combinations thereof. In some embodiments, the indicia can be a manufacturer indicia, such as a logo, image, manufacturer name, etc. to provide the consumer an indicator of the manufacturer, or product indicia, such as dosage levels, active ingredients, flavors, symptoms to be treated, and/or product benefits. In some embodiments, the faceted portion may be angled outward toward the top to allow for additional area for a larger label.

Figure 8:
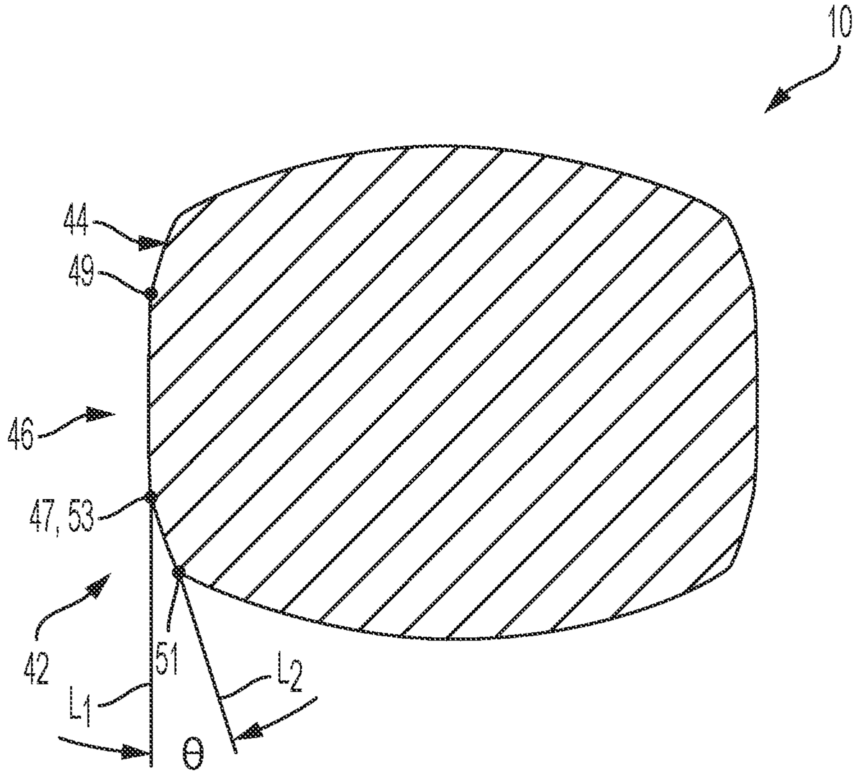
FIG. 8 is a diagrammatic section view along line 5-5 of the bottle of FIG. 3, according to one or more embodiments shown and described herein.

Referring briefly to FIG. 8, a section along line 5-5 of FIG. 3 is shown to illustrate the angles between the central portion 46 and the front and rear faceted portions 42 and 44.

As can be seen, an angle θ is formed between the central portion 46 and the faceted portions 42 and 44. The angle θ may be measured between lines $l_1$ and $l_2$, where $l_1$ passes through endpoints 47 and 49 of the central portion 46 and $l_2$ passes between endpoints 51 and 53 of the front faceted portion 42. In some embodiments, the angle θ may be between about 15 degrees and about 20 degrees. As above with the radiuses of curvature, the angle θ may change slightly along the heights of the faceted portions 42 and 44. In some embodiments, the angle θ may be between about 15 degrees and about 20 degrees along the entire heights of the front faceted portion 42 and the rear faceted portion 44. In some embodiments, the front and rear faceted portions 42 and 44 may be substantially planar instead of having a radius of curvature.

Referring to FIG. 5, these reduced radiuses of curvature $r_1$ compared to $r_2$ along with their angles θ relative to the central portion 46 provide outer transition lines 48 and 50 between the front and rear faceted portions 42, 44 and the central portion 46. The outer transition lines 48 and 50 may have a radius of curvature of between about 0.5 inch (13 mm) and about 1.5 inches (38 mm), such as about one inch (25 mm). The front wall 14 also has a radius of curvature $r_3$ (e.g., between about 1.5 inches (38 mm) and three inches (76 mm)). The radius of curvature $r_3$ may be less than both $r_1$ and $r_2$. Inner transition lines 52 and 54 are provided between the front faceted portion 42 and the front wall 14 and the rear faceted portion 44 and the rear wall 16. The inner transition lines 52 and 54 may have a radius of curvature between about 0.5 inch (13 mm) and about 1.5 inch (38 mm), such as about one inch (25 mm). Referring also to FIGS. 3 and 4, because the outer transition lines 48 and 50 are located outside the inner transition lines 52 and 54, the front faceted portion 42 is visible from in front of the bottle 10 and the rear faceted portion 44 is visible from behind the bottle 10.

Referring again to FIG. 5, the outer transition lines 48 and 50 converge as they extend from the shoulder 22 toward the bottom 15. In contrast, the inner transition lines 52 and 54 are straight vertically and substantially parallel as they extend from the shoulder 22 toward the bottom 15. In some embodiments, both outer transition lines 48 and 50 and inner transition lines 52 and 54 extend over the bottom transition line 23 and through the tapered portion 21 (FIG. 1). Referring briefly to FIG. 3, this convergence of the outer transition lines 48, 50 and vertical orientation of the inner transition lines 52 and 54 provide a visual impression of the front and rear faceted portions 42 and 44 increasing in width from the shoulder 22 toward the bottom 15. What may not be visually detected from in front or behind the bottle 10 is that the central portion 46 decreases in width from the shoulder 22 to the bottom 15 to accommodate the increasing areas of both the front and rear faceted portions 42 and 44. In some embodiments, the front and rear faceted portions 42 and 44 may have a draft angle (e.g., between about one degree and about two degrees) from the bottom transition line 23 to the shoulder 22 and the central portion 46 may have no draft angle.

Figure 6:
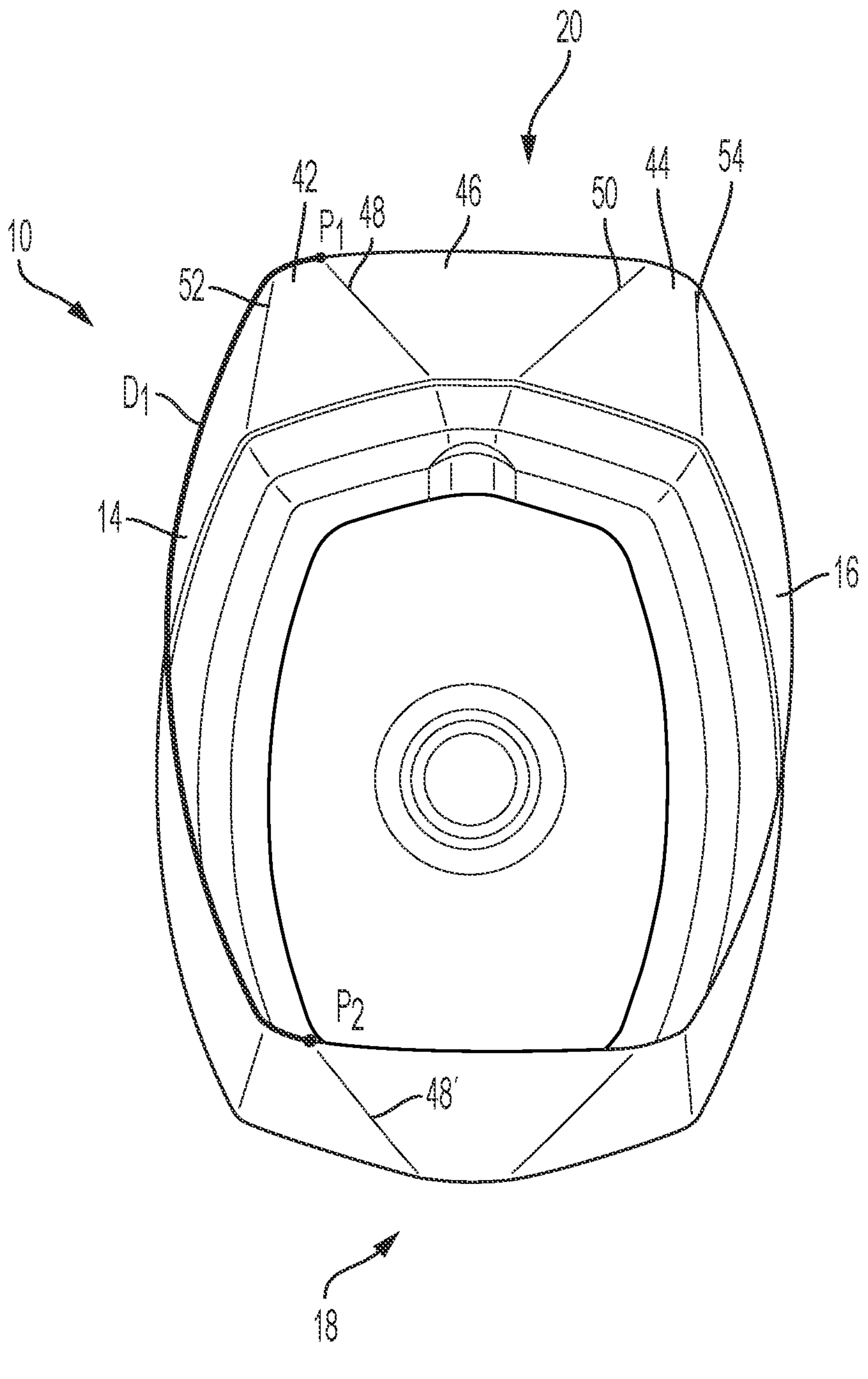
FIG. 6 is a horizontal section view along line 6-6 of the bottle of FIG. 3, according to one or more embodiment shown and described herein.
Figure 7:
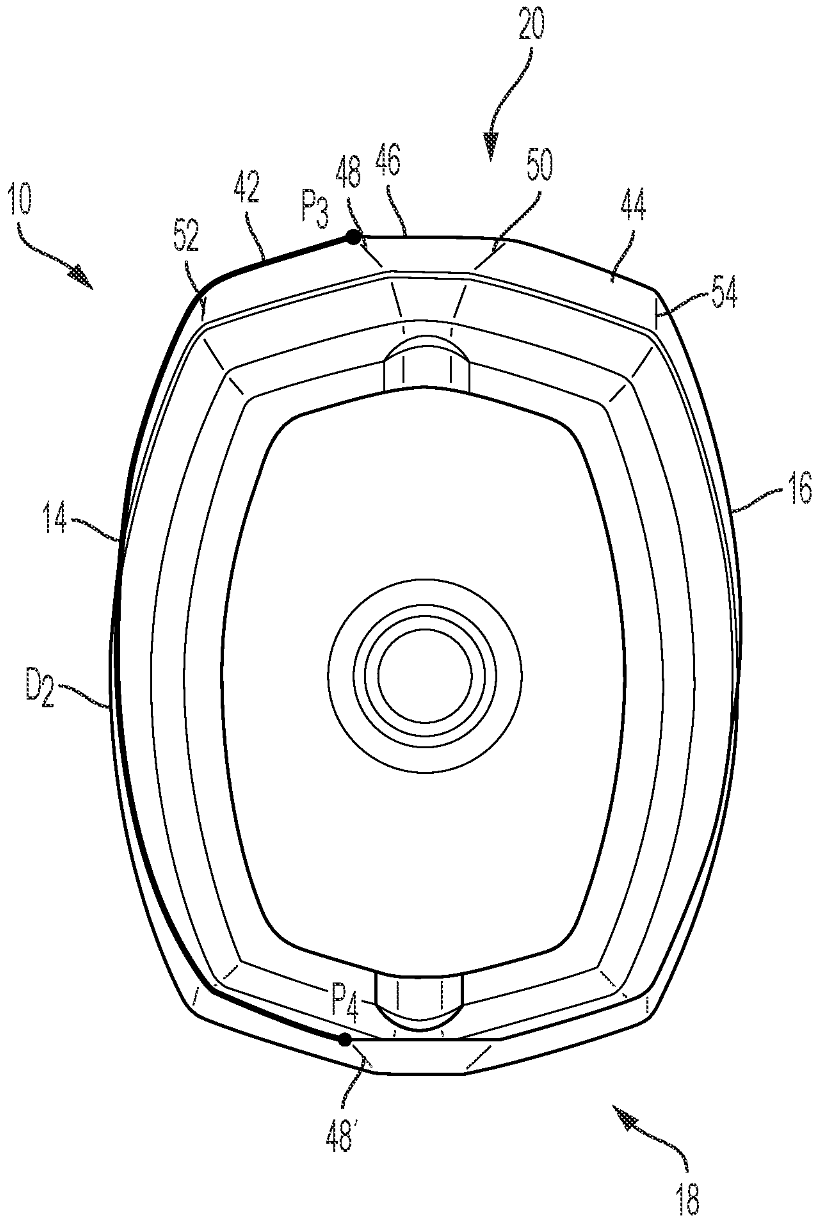
FIG. 7 is another horizontal section view along line 7-7 of FIG. 3, according to one or more embodiments shown and described herein.

FIGS. 6 and 7 illustrate two sectional locations at different heights along the bottle 10. Referring first to FIG. 6, near a top of the bottle 10, a forward-facing perimeter length (shown by weighted line) between points $P_1$ and $P_2$ on the outer transition lines 48 and 48' around the bottle 10 is $D_1$. Referring now to FIG. 7, nearer the bottom 15, a forward-facing perimeter length (shown by weighted line) between points $P_3$ and $P_4$ on the same outer transition lines 48 and 48' is a distance $D_2$ that is greater than $D_1$. Because the outer transition lines 48 and 48' are outermost visible locations of the bottle body 12, a depth of viewing increases from top to bottom of the bottle body 12 and also compared to a bottle having relatively straight side walls without faceted portions.

Figure 9:
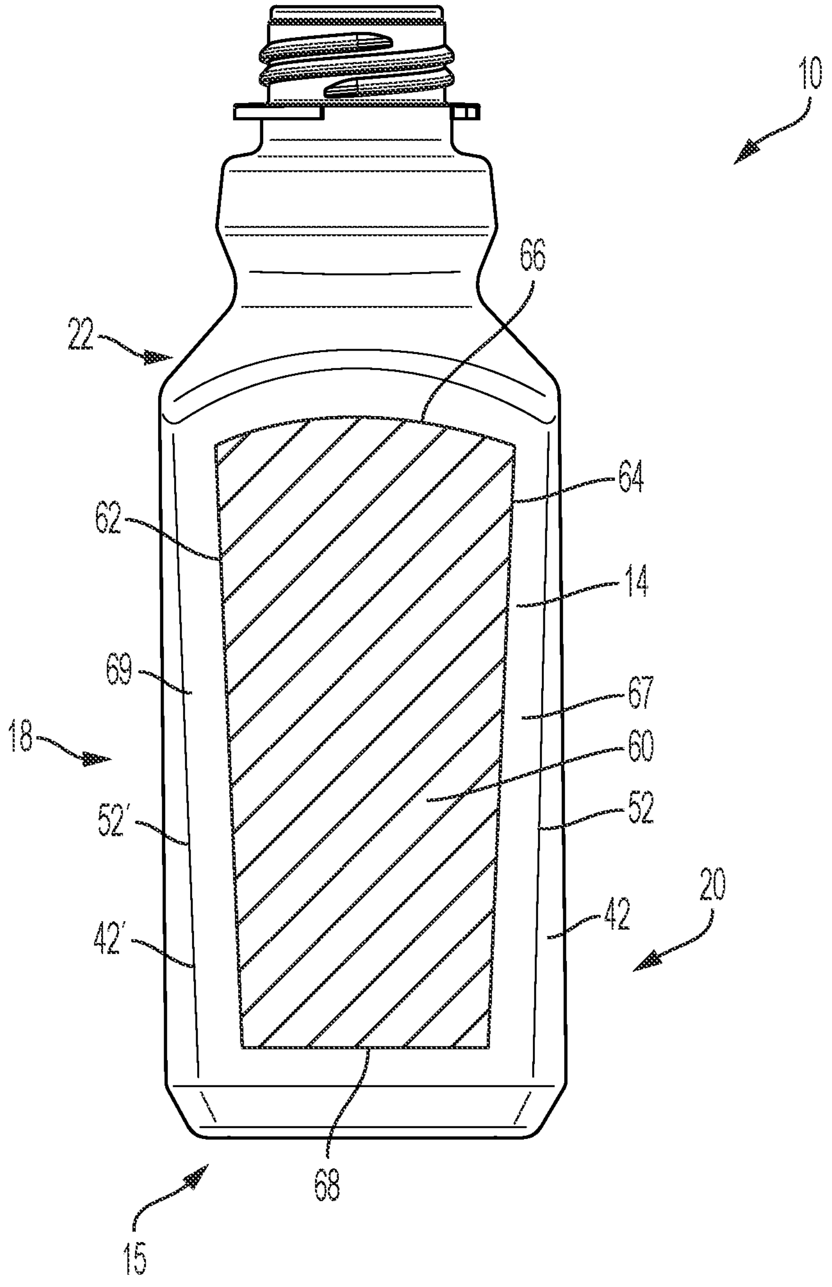
FIG. 9 is a front view of the bottle of FIG. 3 with a front label, according to one or more embodiments shown and described herein.

Referring now to FIG. 9, a front view of the bottle 10 is illustrated including a front label 60. Again, the description of the front view and front label 60 may apply equally to the rear view and a rear label. The front label 60 may include opposite side edges 62 and 64, a top edge 66 and a bottom edge 68. The side edges 62 and 64 may be inwardly spaced from the inner transition lines 52 and 52' providing uncovered regions 67 and 69 adjacent the front label 60 where contents of the bottle 10 can be viewed. Uncovered regions 67 and 69 can be any size. In one embodiment, the front label 60 can substantially cover the front wall 14. In one embodiment, side edges 62 and 64 can substantially extend towards inner transition lines 52 and 52'. In addition to the uncovered regions 67 and 69, the front faceted portions 42 and 42' extend outward and rearward from the inner transition lines 52 and 52'. As discussed above, the front faceted portions 42 and 42' provide additional depth of view adjacent the front label 60, which can aid in visually identifying the contents. One advantage to the front label 60 substantially covering the width and/or height of the front wall 14 is that it can allow for an increase in size of the product label. This can allow for larger font sizes for easier readability and sufficient space for regulatory information, while still allowing the contents of bottle 10 to be viewed from the front through the front faceted portions 42 and 42'.

In some embodiments, there may be between about 15 percent and about 50 percent of liquid visible area through the bottle body 12 adjacent the front label 60. In some embodiments, at least about 10 percent, such as at least about 15 percent, such as at least about 20 percent, such as at least about 25 percent of the forward-facing perimeter length is uncovered by the front label 60 at a location along the height of the bottle body 12. In some embodiments, the front label 60 may cover at least about 50 percent of the front wall 14, alternatively at least about 60 percent, alternatively at least about 70 percent. In some embodiments, the front label 60 may cover from about 50 percent to about 100 percent of the front wall 14, alternatively from about 60 percent to about 95 percent, alternatively from about 65 percent to about 80%. The front label 60 can be transparent or translucent. Alternatively, the front label 60 can be opaque.

Figure 10:
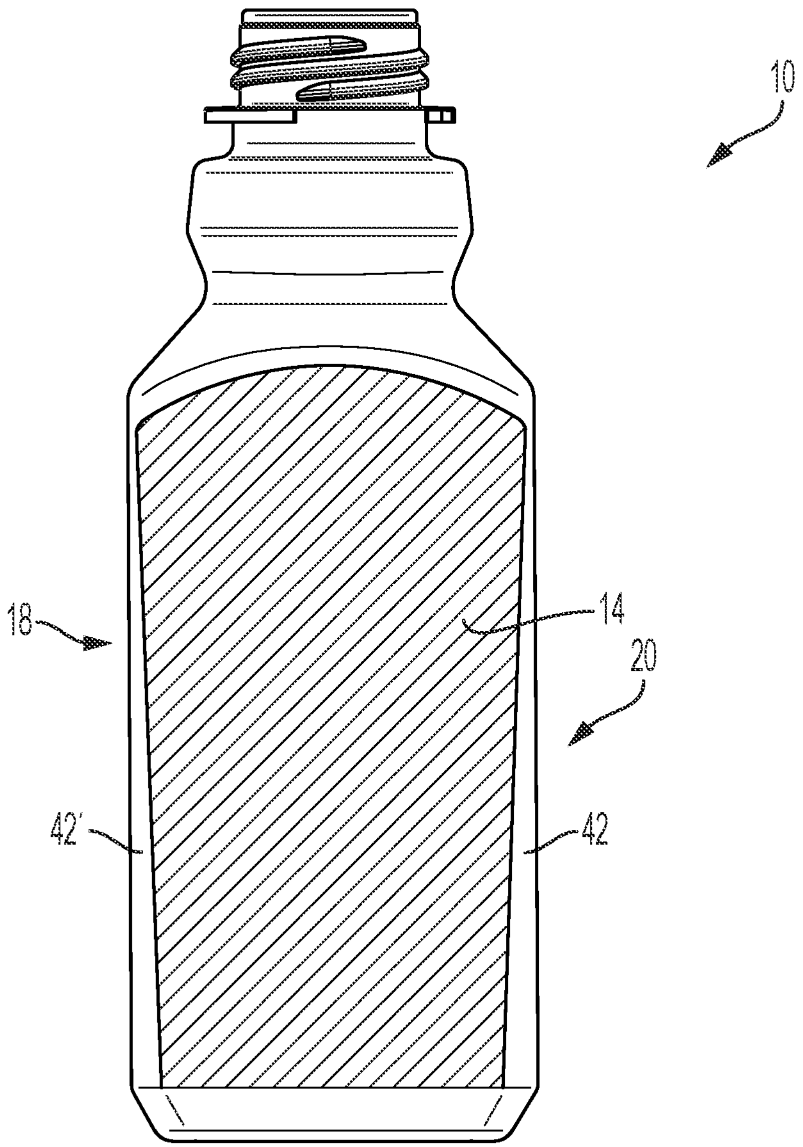
FIG. 10 is a front view of the bottle of FIG. 3 with an entire area of a front wall covered and opaque, according to one or more embodiments shown and described herein.

Referring to FIG. 10, the additional visibility provided by the faceted portions is highlighted by covering the entire face of the front wall 14 (or rear wall 16) so that the front wall 14 is opaque. As can be seen, the front faceted portions 42 and 42' provide visibility into the bottle 10 even when the entire surface of the front wall 14 is covered and opaque. In some embodiments, at least about 10 percent, such as at least about 15 percent, such as at least about 20 percent, such as at least about 30 percent, such as at least about 40 percent, such as between about 20 percent and about 40 percent of the front facing area of the bottle body as shown in FIG. 10 is uncovered and transparent through the front faceted portions 42 and 42' when 100 percent of the front wall is covered and opaque. In some embodiments, the area of the faceted portions 42 and 44 may each be between about 1.5 square inches (10 $cm^2$) and about three square inches (19 $cm^2$).

The bottle 10 can be formed using any suitable material such as a plastic (e.g., polyethylene terephthalate commonly abbreviated PETE). PETE is transparent and allows viewing through the walls 14, 16, 18 and 20 of the bottle 10. An average wall thickness of the bottle 10 may be between about 0.019 inch (0.5 mm) (e.g., for an eight ounce bottle) to about 0.03 inch (0.8 mm) (e.g., for a 12 ounce bottle). Any suitable process can be used to form the bottle 10, such as molding.

The above-described bottles include faceted side walls that include front faceted portions and rear faceted portions that are separated by a central portion. Outer transition lines in the form of bends separate the central portions from their respective front and rear faceted portions. Inner transition lines separate the front and rear faceted portions from their respective front and rear walls. The front and rear faceted portions can provide an increase of viewing area adjacent front and rear labels, which can aid in visually identifying product. This increase in viewing area can aid consumers in visually identify contents in the bottle, such as colors of different medicaments and/or flavors. The front and rear faceted portions may also provide the bottles with increased crush strength by reducing stress concentrations.

The front and rear faceted portions and increased viewing area can also improve color consistency between liquid visible through the bottle and liquid dispensed into the dose cup. The colors can be compared using the CIELAB color space where L* indicates lightness, a* is the red/green coordinate and b* is the yellow/blue coordinate. The coordinates can be determined using a Hunter UltraScan Color Spectrophotometer (Model No. A41-1012-119), commercially available from HunterLab, Inc., Reston, VA or equivalent. ΔL*, Δa* and Δb* may be calculated between the liquid color within the bottle and the liquid color in the dose cup and a total difference, ΔE may be calculated:

$$\Delta E^*_{ab} = \sqrt{(L^*_2 - L^*_1)^2 + (a^*_2 - a^*_1)^2 + (b^*_2 - b^*_1)^2}.$$

In some embodiments, a total difference ΔE between the liquid color visible through the bottle and the liquid color directly visible within the dose cup through an open end may be no greater than about 3.5, such as no greater than about two, such as no greater than about one.

Figure 11:
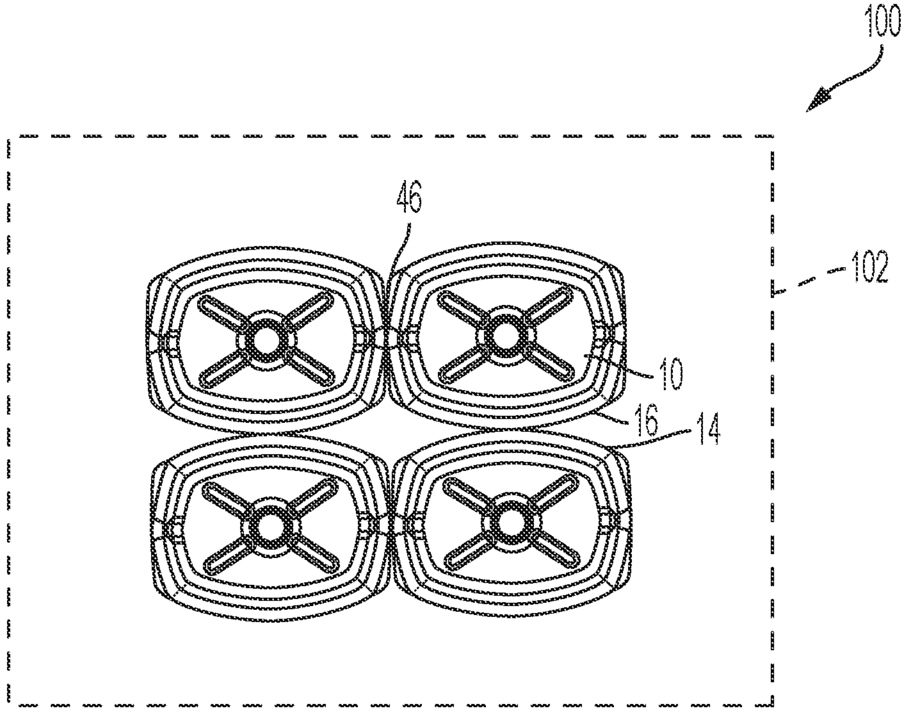
FIG. 11 illustrates an array of the bottles of FIG. 1, according to one or more embodiments shown and described herein.

Referring to FIG. 11, an array 100 of bottles 10 are illustrated. The array 100 of bottles 10 may be placed in a container such as a carton, placed on a shelf, loaded on a pallet, etc., all represented by dashed line 102. The number of bottles 10 within the dashed line 102 in FIG. 11 are for illustrative purposes only and not meant to be limiting. The bottles 10 may be placed side-by-side with the central portions 46 of adjacent bottles 10 in contact and/or with front and rear walls 14, 16 of adjacent bottles 10 in contact. The bottles 10 are shaped to allow for a limited amount of turning of the bottles 10 when placed side-by-side or front-to-back as illustrated. The restraint on turning of the bottles 10 can help maintain a desired orientation of the bottles 10 when being transported or put on display for customer purchase. In one embodiment, the array can comprise two or more bottles containing a liquid pharmaceutical product. In one embodiment the liquid pharmaceutical product can comprise a multi-symptom relief (MSR) cold/flu active which can be used to treat one or more cold/flu symptoms. In one embodiment, the array can comprise a carton comprising a first bottle containing a first liquid pharmaceutical product and a second bottle comprising a second liquid pharmaceutical product. In one embodiment, the first and second liquid pharmaceutical products can be the same composition, alternatively they can be different compositions such as a day-time and night-time composition.

Embodiments can be described with reference to the following numbered clauses, with preferred features laid out in the dependent clauses:

Clause 1. A transparent bottle for holding a liquid, comprising: a bottle body comprising: a front wall; a rear wall; a first side wall and a second side wall that extend between the front wall and the rear wall, the first side wall comprising: a central portion; and a front faceted portion being angled relative to the central portion and being separated from the central portion by a front outer transition line and being separated from the front wall by a front inner transition line; a bottom that extends between the front wall, the rear wall and the first and second side walls, the bottom providing a base structure for supporting the bottle in an upright, standing position; a shoulder that extends inward from the bottle body; and a neck that extends outward from the shoulder toward a mouth.

Clause 2. The bottle of clause 1, wherein the first side wall comprises a rear faceted portion that extends between the central portion and the rear wall, the rear faceted portion being angled relative to the central portion and being separated from the central portion by a rear outer transition line and being separated from the rear wall by a rear inner transition line.

Clause 3. The bottle of clause 2, wherein the second side wall comprises: another central portion; and another front faceted portion that extends between the another central portion and the front wall, the another front faceted portion being angled relative to the central portion and being separated from the another central portion by another front outer transition line and being separated from the front wall by another front inner transition line.

Clause 4. The bottle of clause 3, wherein the second side wall comprises another rear faceted portion that extends between the another central portion and the rear wall, the another rear faceted portion being angled relative to the another central portion and being separated from the another central portion by another rear outer transition line and being separated from the rear wall by another rear inner transition line.

Clause 5. The bottle of clause 4, wherein the front inner transition line and the another front inner transition line are substantially parallel and the rear inner transition line and the another rear transition line are substantially parallel.

Clause 6. The bottle of clause 5, wherein the front outer transition line and the rear outer transition line extend toward each other from the shoulder toward the bottom.

Clause 7. The bottle of any one of clauses 3-6, wherein a forward-facing perimeter length between the front outer transition line and the another front outer transition line increases from the shoulder toward the bottom.

Clause 8. The bottle of any one of clauses 1-7 further comprising a front label that covers a region of the front wall, wherein the front faceted portion is uncovered by the front label.

Clause 9. The bottle of clause 8, wherein the front label covers at least about 50 percent of the front wall.

Clause 10. The bottle of any one of clauses 1-9, wherein the neck extends outward from the shoulder at a transition region and increases in width at a filling region.

Clause 11. The bottle of clause 10, wherein the neck extends outward from the shoulder at a transition region and increases in width at a filling region.

Clause 12. A transparent bottle for holding a liquid, comprising: a bottle body comprising: a front wall; a rear wall; a first side wall that extends between the front wall and the rear wall, the first side wall comprising a central portion and a front faceted portion that extends between the central portion and the front wall; a second side wall that extends between the front wall and the rear wall, the second side wall comprising another central portion and another front faceted portion that extends between the central portion and the front wall; a shoulder that extends inward from the bottle body; and a neck that extends outward from the shoulder toward a mouth; wherein at least about five percent of a front facing area of the bottle body is uncovered and transparent through the front faceted portion when 100 percent of the front wall is covered and opaque.

Clause 13. The bottle of clause 12, wherein at least about five percent of the bottle body is uncovered and transparent through the another front faceted portion when 100 percent of the front wall is covered and opaque.

Clause 14. The bottle of clause 12 or 13, wherein the front faceted portion has a radius of curvature that is less than a radius of curvature of the central portion and being separated from the central portion by a front outer transition line and being separated from the front wall be a front inner transition line.

Clause 15. The bottle of clause 14, wherein the first side wall comprises a rear faceted portion that extends between the central portion and the rear wall, the rear faceted portion having a radius of curvature that is less than the radius of curvature of the central portion and being separated from the central portion by a rear outer transition line and being separated from the rear wall by a rear inner transition line.

Clause 16. The bottle of clause 15, wherein the another front faceted portion has a radius of curvature that is less than the radius of curvature of the central portion and being separated from the another central portion by another front outer transition line and being separated from the front wall by another front inner transition line.

Clause 17. The bottle of clause 16, wherein the second side wall comprises another rear faceted portion that extends between the another central portion and the rear wall, the another rear faceted portion having a radius of curvature that is less than the radius of curvature of the another central portion and being separated from the another central portion by another rear outer transition line and being separated from the rear wall by another rear inner transition line.

Clause 18. The bottle of clause 17, wherein the front inner transition line and the another front inner transition line are substantially parallel and the rear inner transition line and the another rear transition line are substantially parallel.

Clause 19. The bottle of clause 18, wherein the front outer transition line and the rear outer transition line extend toward each other from the shoulder toward the bottom.

Clause 20. The bottle of any one of clauses 15-19, wherein a forward-facing perimeter length between the front outer transition line and the another front outer transition line increases from the shoulder toward the bottom.

Clause 21. The bottle of any one of clauses 12-20, wherein the neck extends outward from the shoulder at a transition region and increases in width at a filling region.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Values disclosed herein as ends of ranges are not to be understood as being strictly limited to the exact numerical values recited. Instead, unless otherwise specified, each numerical range is intended to mean both the recited values and any real numbers including integers within the range. For example, a range disclosed as "1 to 10" is intended to mean "1, 2, 3, 4, 5, 6, 7, 8, 9, and 10" and a range disclosed as "1 to 2" is intended to mean "1.1, 1.2, 1.3, 1.4, 1.5, 1.6, 1.7, 1.8, 1.9, and 2.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A transparent bottle for holding a liquid, comprising:

a bottle body formed of a transparent plastic material, the bottle body comprising:

a convex front wall;

a convex rear wall opposite the convex front wall;

a first side wall; and a second side wall opposite the first side wall, wherein each of the first side wall and the second side wall, respectively, extends between and connects to the convex front wall and the convex rear wall, the first side wall and the second side wall each comprising:

a central portion;

a front faceted portion that extends between the central portion and the convex front wall, the front faceted portion is angled relative to the central portion and is separated from the central portion by a front outer transition line and is separated from the convex front wall by a front inner transition line; and a rear faceted portion that extends between the central portion and the convex rear wall, the rear faceted portion is angled relative to the central portion and is separated from the central portion by a rear outer transition line and is separated from the convex rear wall by a rear inner transition line;

wherein the convex front wall and the convex rear wall are each convex such that they both curve outwardly from the first side wall to the second side wall;

a bottom that extends between the convex front wall, the convex rear wall and the first and second side walls, the bottom providing a base structure for supporting the transparent bottle in an upright, standing position;

a shoulder that extends inward from the bottle body; and a neck that extends outward from the shoulder toward a mouth;

wherein the convex front wall, the convex rear wall, and the first and second side walls define a continuous periphery in the form of a convex shape when a horizontal cross-section, through the middle of the transparent bottle when standing, is seen orthogonally from an axis that is perpendicular relative to the horizontal cross-section and that is co-linear with the center of the mouth.

2. The transparent bottle of claim 1, wherein the front inner transition line and the another front inner transition line are substantially parallel and the rear inner transition line and the another rear transition line are substantially parallel.

3. The transparent bottle of claim 2, wherein the front outer transition line and the rear outer transition line extend toward each other from the shoulder toward the bottom.

4. The transparent bottle of claim 1 further comprising a front label that covers a region of the convex front wall, wherein the front faceted portion is uncovered by the front label.

5. The transparent bottle of claim 4, wherein the front label covers at least about 50 percent of the convex front wall.

6. The transparent bottle of claim 1, wherein the neck extends outward from the shoulder at a transition region and increases in width at a filling region.

7. The transparent bottle of claim 6, wherein the filling region has a volume of from about 15 mL to about 25 mL.

8. A transparent bottle for holding a liquid, comprising:

a bottle body formed of a transparent plastic material, the bottle body comprising:

a convex front wall;

a convex rear wall opposite the convex front wall;

a first side wall that extends between and connects to each of the convex front wall and the convex rear wall, the first side wall comprising a central portion and a front faceted portion that extends between the central portion and the convex front wall;

a second side wall that is opposite the first side wall and that extends between and connects to each of the convex front wall and the convex rear wall, the second side wall comprising another central portion and another front faceted portion that extends between the central portion and the convex front wall;

wherein the convex front wall and the convex rear wall are each convex such that they both curve outwardly from the first side wall to the second side wall;

a shoulder that extends inward from the bottle body; and a neck that extends outward from the shoulder toward a mouth;

wherein at least about five percent of a front facing area of the bottle body is uncovered and transparent through the front faceted portion when 100 percent of the convex front wall is covered and opaque;

wherein the convex front wall, the convex rear wall, and the first and second side walls define a continuous periphery in the form of a convex shape when a horizontal cross-section, through the middle of the transparent bottle when standing, is seen orthogonally from an axis that is perpendicular relative to the horizontal cross-section and that is co-linear with the center of the mouth.

9. The transparent bottle of claim 8, wherein at least about five percent of a front facing area of the bottle body is uncovered and transparent through the another front faceted portion when 100 percent of the convex front wall is covered and opaque.

10. The transparent bottle of claim 8, wherein the front faceted portion has a radius of curvature that is less than a radius of curvature of the central portion and is separated from the central portion by a front outer transition line and is separated from the convex front wall by a front inner transition line.

11. The transparent bottle of claim 10, wherein the first side wall comprises a rear faceted portion that extends between the central portion and the convex rear wall, the rear faceted portion having a radius of curvature that is less than the radius of curvature of the central portion and is separated from the central portion by a rear outer transition line and is separated from the convex rear wall by a rear inner transition line.

12. The transparent bottle of claim 11, wherein the another front faceted portion has a radius of curvature that is less than the radius of curvature of the central portion and is separated from the another central portion by another front outer transition line and is separated from the convex front wall by another front inner transition line.

13. The transparent bottle of claim 12, wherein the second side wall comprises another rear faceted portion that extends between the another central portion and the convex rear wall, the another rear faceted portion having a radius of curvature that is less than the radius of curvature of the another central portion and is separated from the another central portion by another rear outer transition line and is separated from the convex rear wall by another rear inner transition line.

14. The transparent bottle of claim 13, wherein the front inner transition line and the another front inner transition line are substantially parallel and the rear inner transition line and the another rear transition line are substantially parallel.

15. The transparent bottle of claim 14, wherein the front outer transition line and the rear outer transition line extend toward each other from the shoulder toward the bottom.

16. The transparent bottle of claim 11, wherein a forward-facing perimeter length between the front outer transition line and the another front outer transition line increases from the shoulder toward the bottom.

17. The transparent bottle of claim 8, wherein the neck extends outward from the shoulder at a transition region and increases in width at a filling region.

* * * * *